United States Patent
Tanaka et al.

(10) Patent No.: US 6,911,481 B2
(45) Date of Patent: Jun. 28, 2005

(54) METHOD OF REGENERATING ION EXCHANGE RESIN

(75) Inventors: Fujio Tanaka, Sendai (JP); Takashi Adachi, Sendai (JP); Toshimi Suzuki, Sendai (JP); Mutsuro Noguchi, Sendai (JP); Tomoaki Kobayashi, Sendai (JP)

(73) Assignee: Santoku Chemical Industries Co., Ltd. (JP)

( * ) Notice: Subject to any disclaimer, the term of this patent is extended or adjusted under 35 U.S.C. 154(b) by 0 days.

(21) Appl. No.: 09/854,807

(22) Filed: May 14, 2001

(65) Prior Publication Data

US 2002/0014459 A1 Feb. 7, 2002

(30) Foreign Application Priority Data

Jun. 21, 2000 (JP) .......... 2000-186902
Dec. 14, 2000 (JP) .......... 2000-380503

(51) Int. Cl.[7] .......... B01J 49/00
(52) U.S. Cl. .......... 521/26; 210/675; 210/678
(58) Field of Search .......... 210/675, 677, 210/678; 521/26

(56) References Cited

U.S. PATENT DOCUMENTS

| | | | |
|---|---|---|---|
| 3,305,314 A | | 2/1967 | Freeland et al. .......... 423/584 |
| 3,531,401 A | * | 9/1970 | Crits .......... 210/677 |
| 3,711,401 A | * | 1/1973 | Hamilton et al. .......... 210/677 |
| 3,975,267 A | | 8/1976 | Wendel .......... 210/678 |
| 3,989,624 A | * | 11/1976 | Wachsmuth .......... 210/677 |
| 4,652,352 A | * | 3/1987 | Saieva .......... 210/677 |
| 5,393,416 A | * | 2/1995 | Kozak et al. .......... 210/96.1 |
| 6,340,712 B1 | * | 1/2002 | Kunin et al. .......... 521/26 |

FOREIGN PATENT DOCUMENTS

| | | |
|---|---|---|
| DE | 20 17 131 A | 10/1971 |
| EP | 0 013 912 A | 8/1980 |
| FR | 2772740 A | 6/1999 |
| WO | WO 99/04904 A | 2/1999 |

OTHER PUBLICATIONS

Japanese Abstract, JP 09 012306 A, Sumitomo Chem. Co., Ltd., Jan. 14, 1997, *Derwent Publications*.

* cited by examiner

*Primary Examiner*—Ivars C. Cintins
(74) *Attorney, Agent, or Firm*—The Webb Law Firm

(57) ABSTRACT

A method of regenerating an ion exchange resin, comprising the steps of packing a used ion exchange resin in a regeneration tower; and repeating at least twice a step comprising passing an aqueous solution of regenerant through the regeneration tower downward from a top part of the regeneration tower and thereafter passing ultra-pure water through the regeneration tower upward from a bottom of the regeneration tower. This method enables regenerating an ion exchange resin efficiently and homogeneously without mixing of the regenerant into ion exchange resin towers for purification.

4 Claims, 2 Drawing Sheets

METHOD OF REGENERATING ION EXCHANGE RESIN

FIELD OF THE INVENTION

The present invention relates to a method of regenerating an ion exchange resin. More particularly, the present invention relates to a method of regenerating an ion exchange resin, which enables minimizing impurity residues.

BACKGROUND OF THE INVENTION

An aqueous hydrogen peroxide solution is widely used in various fields, for example, for a bleaching agent for paper and pulp or as a component in chemical polishing fluids. In recent years, the aqueous hydrogen peroxide solution has increasingly been used in the electronic industry, for example, as a cleaning agent for silicon wafers and as a cleaning agent in production processes of semiconductors. Accordingly, there is a demand for an aqueous hydrogen peroxide solution of enhanced quality in purity as obtained by minimizing the content of various impurities in the aqueous hydrogen peroxide solution.

Generally, hydrogen peroxide is now produced exclusively by the anthraquinone process. In the anthraquinone process, first, a derivative of anthraquinone, such as a 2-alkylanthraquinone, is hydrogenated into anthrahydroquinone in the presence of a hydrogenation catalyst in a water-insoluble solvent. Subsequently, after the catalyst is removed, the reaction product is oxidized with air to generate the original 2-alkylanthraquinone, and at the same time hydrogen peroxide is produced. The produced hydrogen peroxide is extracted from the oxidation product with water to thereby obtain an aqueous solution containing hydrogen peroxide. This process is generally known as the anthraquinone autoxidation process. The aqueous hydrogen peroxide solution produced by the anthraquinone autoxidation process contains inorganic ion/compound impurities, such as Al, Fe, Cr, Na and Si, attributed to, for example, the materials constituting the apparatus. Therefore, the aqueous hydrogen peroxide solution is subjected to purification operation for removing such impurities to thereby attain a high purity in accordance with the required quality in particular use.

Especially in the electronic industry, an extremely high purity is required for the aqueous hydrogen peroxide solution. It is required that, in the aqueous hydrogen peroxide solution, the content of organic impurities be not greater than 10 ppm and the content of metal ion impurities be not greater than 1 ppb. For the removal of impurities from the aqueous hydrogen peroxide solution, it is generally known to treat with an ion exchange resin, a chelate resin, an adsorption resin or the like. When the removal of impurities is carried out on an industrial scale with the use of such a resin, there is commonly employed the continuous liquid pass method (tower process) which ensures high operation efficiency and high removing ratio.

The thus spent ion exchange resin is generally regenerated by a regenerant. For example, an anion exchange resin is regenerated by packing the anion exchange resin in a tower and sequentially passing an alkali aqueous solution, an acid aqueous solution and once more an alkali aqueous solution through the anion exchange resin tower.

However, this conventional method has a drawback in that the regenerant may be mixed in the ion exchange resin to thereby disenable satisfactorily removing ionic impurities from a charged aqueous hydrogen peroxide solution. Further, this conventional method has another drawback in that, in the layer of ion exchange resin, there are formed channels (this phenomenon known as "channeling"), through which much of the regenerant is passed to thereby cause the contact of the regenerant with the ion exchange resin to become nonuniform with the result that the ion exchange resin cannot be homogeneously regenerated. Still further, this regeneration of ion exchange resin is carried out in a purifier tower having been used in the purification of crude aqueous hydrogen peroxide solution, so that the regenerant remains in the purifier tower and mixed little by little into the purified aqueous hydrogen peroxide solution. Furthermore, this conventional method is disadvantageous in that, during the regeneration of ion exchange resin, the ion exchange resin tower cannot be employed for purification to thereby lower the production efficiency of purified aqueous hydrogen peroxide solution.

In these circumstances, the inventors have made extensive and intensive studies with a view toward solving the above problems. As a result, it has been found that packing a spent ion exchange resin in a regeneration tower and regenerating the ion exchange resin, specifically, regenerating the ion exchange resin by repeating at least twice a step comprising passing an aqueous solution of regenerant through the regeneration tower downward from an upper nozzle of the regeneration tower and passing ultra-pure water through the regeneration tower upward from a bottom of the regeneration tower enables not only producing a regenerated ion exchange resin wherein impurity residues are minimized but also effecting homogeneous regeneration of the ion exchange resin. Further, it has been found that such a regeneration enables avoiding mixing of the regenerant into the purifier tower and enables efficiently accomplishing the purification of aqueous hydrogen peroxide solution without interruption thereof. The present invention has been completed on the basis of these findings.

It is an object of the present invention to provide a method of regenerating an ion exchange resin, which enables minimizing impurity residues.

SUMMARY OF THE INVENTION

The method of regenerating an ion exchange resin according to the present invention comprises the steps of:

packing a used ion exchange resin in a regeneration tower; and repeating at least twice a step comprising passing an aqueous solution of regenerant through the regeneration tower downward from a top of the regeneration tower and thereafter passing ultra-pure water through the regeneration tower upward from a bottom of the regeneration tower.

In the conventional regeneration of ion exchange resins, channeling inevitably occurs to thereby cause regeneration and finishing of ion exchange resins to be nonuniform and to thereby adversely affect the capacity of ion exchange. By contrast, when an ion exchange resin is regenerated by the above repetition of downflow of regenerant followed by upflow of ultra-pure water, convection of the ion exchange resin occurs in the regeneration tower to thereby break generated channeling with the result that the ion exchange resin can be regenerated efficiently and homogeneously. Further, by virtue of the repetition of downflow and upflow, the ion exchange resin repeats shrinkage-swelling cycle to thereby enable washing the internal part of ion exchange resin. Still further, in the present invention, the regeneration of ion exchange resin is carried out by an ion exchange resin tower (regeneration tower) different from purifier towers.

Therefore, mixing of the regenerant into the purifier towers can be avoided, and it is not needed to interrupt the purification of aqueous hydrogen peroxide solution.

It is preferred that the aqueous solution of regenerant be passed downward at a space velocity of 1 to 5 $hr^{-1}$ and that the ultra-pure water be passed upward at a space velocity of 10 to 30 $hr^{-1}$.

In the regeneration tower, parts brought into contact with the ion exchange resin, the regenerant and the ultra-pure water are preferably composed of a fluororesin, a vinyl chloride resin or a polyolefin resin.

DETAILED DESCRIPTION OF THE INVENTION

The method of regenerating an ion exchange resin according to the present invention will be described in detail below.

The present invention is characterized in that the regeneration of used ion exchange resin is performed by repeating a step comprising passing an aqueous solution of regenerant through a regeneration tower packed with ion exchange resin downward from a top of the regeneration tower and thereafter passing ultra-pure water through the regeneration tower upward from a bottom of the regeneration tower.

Figure 1:
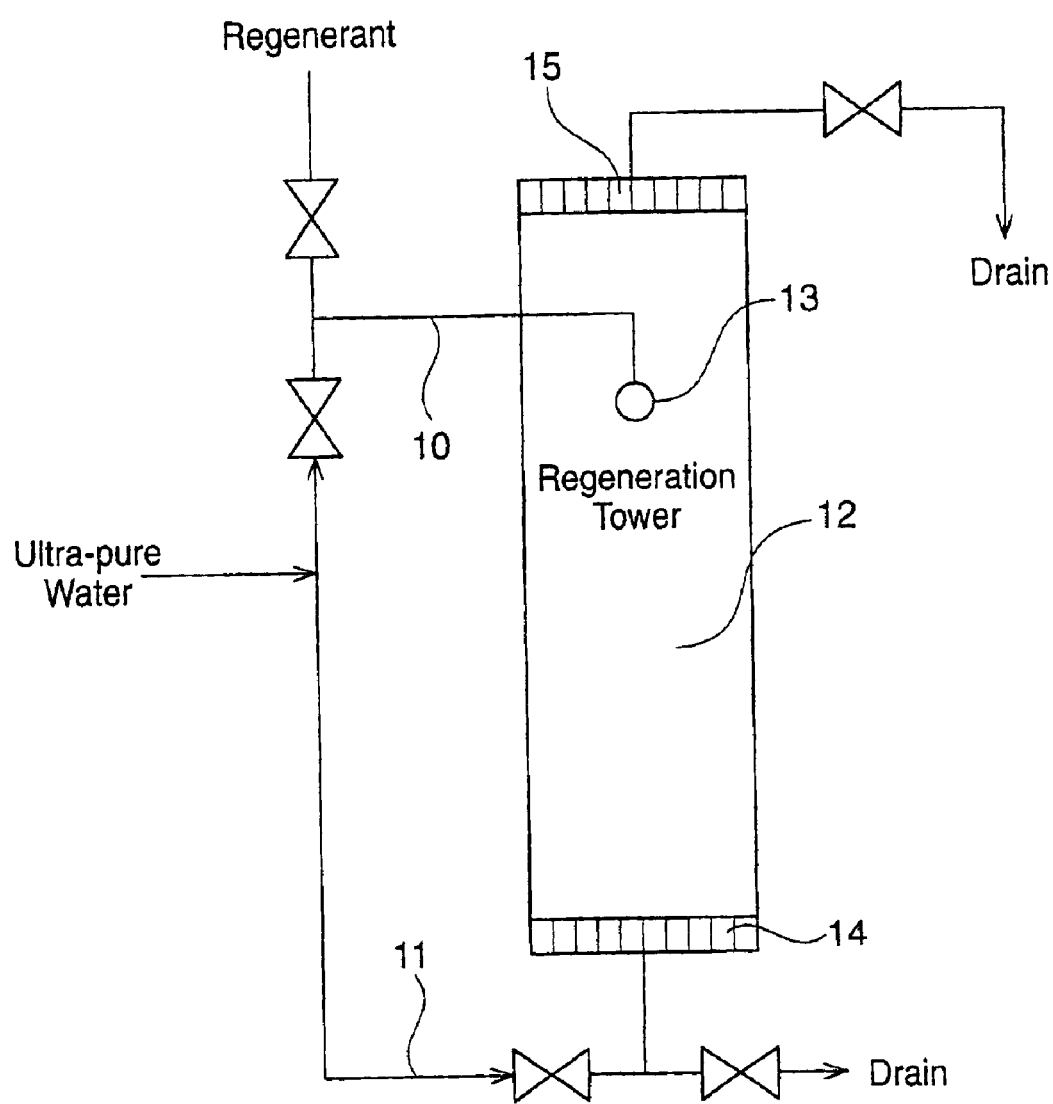
FIG. 1 is a schematic diagram showing the method of regenerating an ion exchange resin according to the present invention.

The present invention will now be specified with reference to the flow diagram of FIG. 1. FIG. 1 is a flow diagram showing one mode of method of regenerating an ion exchange resin according to the present invention. In FIG. 1, numerals 10 and 11 denote piping lines; numeral 12 a regeneration tower; numeral 13 an upper nozzle; numeral 14 a bottom strainer; and numeral 15 a top strainer.

An ion exchange resin having been used in the purification of aqueous hydrogen peroxide solution is drawn in the form of a slurry from a purifier tower to regeneration tower 12 by, for example, vacuum suction. The ion exchange resin is fed through strainer 14 arranged at the top of the regeneration tower into the regeneration tower 12 under pressure in the form of a water suspension. An aqueous solution of regenerant is passed through piping line 10 and fed to the ion exchange resin from upper nozzle 13. The aqueous solution of regenerant having been passed through the ion exchange resin is discharged through bottom strainer 14. On the other hand, ultra-pure water is passed through piping line 11 and fed to the ion exchange resin through the bottom strainer 14. The ultra-pure water having been passed through the ion exchange resin is discharged through the top strainer 15.

Specifically, referring to FIG. 1, the aqueous solution of regenerant is passed downward from a top part of the regeneration tower at a SV (space velocity) of 1 to 5 $hr^{-1}$ and at a BV (bed volume, indicating what volume of liquid is applied per volume of ion exchange resin) of 0.5 to 1 L/L-R (this downward passing hereinafter may be referred to as "downflow"). The downflow of regenerant is discontinued, and ultra-pure water is passed upward from a bottom of the regeneration tower at a SV of 10 to 30 $hr^{-1}$ and at a BV of 0.1 to 0.5 L/L-R (this upward passing hereinafter may be referred to as "upflow"). In the present invention, this step comprising downflow and upflow is repeated at least twice.

Finally, the ion exchange resin is subjected to washing with ultra-pure water, which is carried out by repeating 4 to 9 times downward flow at a SV of 10 to 30 $hr^{-1}$ and at a BV of 3 to 5 L/L-R followed by upward flow at a SV of 10 to 30 $hr^{-1}$ and at a BV of 3 to 5 L/L-R. The final washing is performed with 30 to 60 volumes of ultra-pure water per volume of the resin.

In this regeneration, the ion exchange resin repeats shrinkage-swelling cycle to thereby enable washing the internal part of ion exchange resin. Moreover, any channeling is broken, so that the whole of ion exchange resin can be regenerated homogeneously.

Figure 2:
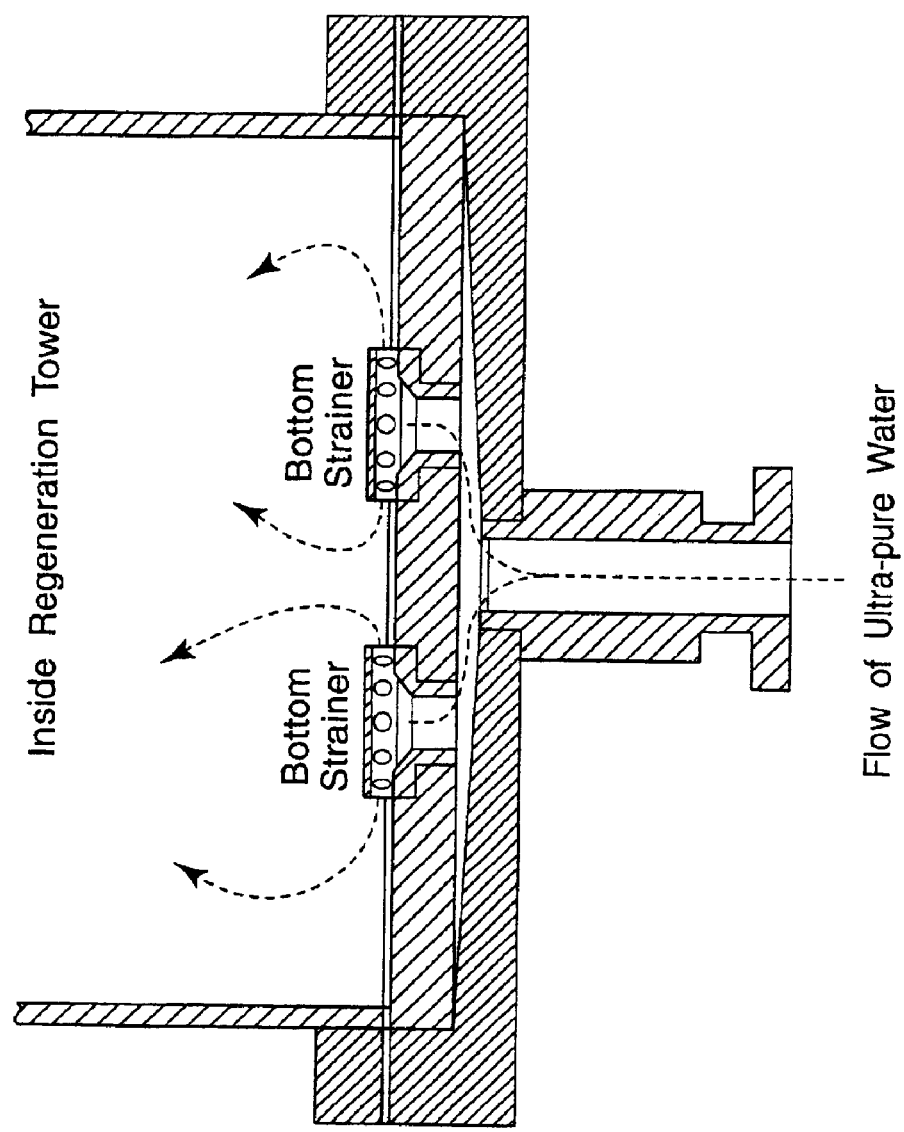
FIG. 2 is a schematic sectional view of ports for ultra-pure water passing for use in the method of regenerating an ion exchange resin according to the present invention.

The bottom strainer 14, referring to FIG. 2, is preferred from the viewpoint that ultra-pure water can be passed through its side hole. FIG. 2 is a schematic sectional view of the bottom strainer. When use is made of the bottom strainer having a side hole as shown in FIG. 2, not only can the weight of the ion exchange resin be resisted but also ultra-pure water can be uniformly passed through the ion exchange resin layer. Furthermore, due to the resistance of the strainer against the weight of the ion exchange resin, a large amount of ion exchange resin can be regenerated once.

The space velocity of aqueous regenerant solution passed is preferably in the range of 1 to 5 $hr^{-1}$, still preferably 1 to 4 $hr^{-1}$. The space velocity of ultra-pure water passed is preferably in the range of 10 to 30 $hr^{-1}$, still preferably 10 to 25 $hr^{-1}$.

In the regeneration tower for use in the present invention, parts brought into contact with the ion exchange resin, the regenerant and the ultra-pure water (in particular, liquid feed pipes and internal wall of the regeneration tower) are preferably composed of any of a fluororesin, a vinyl chloride resin and a polyolefin resin. When such parts are composed of these resins, mixing of impurities from such parts can be avoided.

As the fluororesin, generally, there can be employed polytetrafluoroethylene resin (PTFE), tetrafluoroethylene/perfluoroalkyl vinyl ether copolymer resins (PFA), tetrafluoroethylene/hexafluoropropylene copolymer resin (FEP), polytrifluorochloroethylene resin (PCTFE), tetrafluoroethylene/ethylene copolymer (ETFE), polyvinylidene fluoride resin (PVDF), polyvinyl fluoride resin (PVF) and the like. As the polyolefin resin, there can be employed polyethylene, polypropylene and the like.

The ion exchange resin to be regenerated can be an anion exchange resin or a cation exchange resin. Also, the ion exchange resin can be a mixed bed composed of an anion exchange resin and a cation exchange resin. In the present invention, it is preferred to employ a single bed of ion exchange resin.

As the cation exchange resin for use in the present invention, there can be mentioned cation exchange resin in $H^+$ form known as a strongly acidic cation exchange resin. A strongly acidic cation exchange resin of network molecular structure wherein sulfonate groups are introduced is preferably used as the cation exchange resin in $H^+$ form. For example, PK216, SK1B and IR-120B are used as the above cation exchange resin in $H^+$ form.

In the regeneration of the cation exchange resin in $H^+$ form, aqueous solutions of common inorganic acids such as sulfuric acid and hydrochloric acid are used. The concentration of inorganic acid in the aqueous regenerant solution is preferably in the range of 5 to 15% by weight, still preferably 5 to 12% by weight. It is preferred that the regenerant be used in an amount of at least 3 times, especially 4 to 12 times, the quantity (volume) of cation exchange resin to be treated.

The aqueous solution of regenerant is generally passed downward at a SV (space velocity) of 1 to 5 hr$^{-1}$ and at a BV of 0.5 to 1 L/L-R. The subsequent washing is performed by passing ultra-pure water upward at a SV of 10 to 30 hr$^{-1}$ and at a BV of 0.1 to 0.5 L/L-R.

After the regenerant passing followed by ultra-pure water passing, an ultra-pure water washing cycle comprising downflow of ultra-pure water and upflow of ultra-pure water is repeated 4 to 9 times to thereby effect complete washing of the regenerated ion exchange resin. It is preferred that the upflow of ultra-pure water be performed at a SV of 10 to 30 hr$^{-1}$ and at a BV of 3 to 5 L/L-R and that the downflow of ultra-pure water be also performed at a SV of 10 to 30 hr$^{-1}$ and at a BV of 3 to 5 L/L-R. The washing is preferably performed with 30 to 60 volumes of ultra-pure water per volume of the resin.

When a new cation exchange resin (Na$^+$-type) is used, it is preferred to first perform conditioning. The conditioning is accomplished by first regenerating a new cation exchange resin (Na$^+$-type) with an aqueous solution of inorganic acid (aqueous regenerant solution), subsequently passing a 30 to 60% by weight aqueous hydrogen peroxide solution through the cation exchange resin at a SV of 5 to 40 hr$^{-1}$ and at a BV of 50 to 100 L/L-R and thereafter regenerating the cation exchange resin with an aqueous solution of inorganic acid (aqueous regenerant solution).

As the anion exchange resin for use in the present invention, there can be mentioned those in the form of carbonate ions, hydrogen carbonate ions, hydroxide ions, fluoride ions and other ions.

As these anion exchange resins, generally, use can be made of, for example, strongly basic resins obtained by chloromethylating a crosslinked styrene/divinylbenzene copolymer and aminating the chloromethylation product with trimethylamine or dimethylethanolamine into a quaternary salt; weakly basic resins comprising a crosslinked styrene/divinylbenzene copolymer having a primary or tertiary amine as an exchange group; resins comprising a crosslinked acrylic acid polymer having a tertiary amine as an exchange group; and pyridine based anion exchange resins comprising a polymer having an unsubstituted or substituted pyridyl group. Of these, strongly basic anion exchange resins having a quaternary ammonium group are preferred. Various anion exchange resins having a quaternary ammonium group are commercially available, representative examples of which include Diaion (trade name) PA series (for example, PA316 and PA416) and SA series (for example, SA10A and SA20A) and Amberlite (trade name) IRA series (for example, IRA-400, IRA-410, IRA-900 and IRA-904). These resins are generally available on the market in the form of chloride ions.

The regenerant for anion exchange resin can be appropriately selected depending on the type of target ions. When the anion exchange resin is in the form of carbonate ions or hydrogen carbonate ions, a known carbonate or bicarbonate salt such as sodium carbonate, sodium bicarbonate, potassium carbonate or potassium bicarbonate can be used as the regenerant. When the anion exchange resin is in the form of hydroxide ions, a strong alkali such as sodium hydroxide or potassium hydroxide can be used as the regenerant. Further, when the anion exchange resin is in the form of fluoride ions, sodium fluoride, potassium fluoride or ammonium fluoride can be used as the regenerant.

The appropriate salt concentration of the aqueous regenerant solution is in the range of 2 to 10% by weight, preferably 2 to 8% by weight, when the anion exchange resin is in the form of hydroxide ions; 5 to 15% by weight, preferably 5 to 12% by weight, when the anion exchange resin is in the form of carbonate or hydrogen carbonate ions; and 1 to 4% by weight, preferably 2 to 4% by weight, when the anion exchange resin is in the form of fluoride ions. It is preferred that the regenerant be used in an amount of at least 3 times, especially 4 to 12 times, the quantity (volume) of anion exchange resin to be treated.

The regenerant is generally passed downward at a SV (space velocity) of 1 to 5 hr$^{-1}$ and at a BV of 0.5 to 1 L/L-R. The subsequent washing is performed by upflow of ultra-pure water at a SV of 10 to 30 hr$^{-1}$ and at a BV of 0.1 to 0.5 L/L-R.

After the regenerant passing followed by ultra-pure water passing, an ultra-pure water washing cycle comprising downflow of ultra-pure water and upflow of ultra-pure water is repeated 4 to 9 times to thereby effect complete washing of the regenerated ion exchange resin. It is preferred that the upflow of ultra-pure water be performed at a SV of 10 to 30 hr$^{-1}$ and at a BV of 3 to 5 L/L-R and that the downflow of ultra-pure water be also performed at a SV of 10 to 30 hr$^{-1}$ and at a BV of 3 to 5 L/L-R. The washing is preferably performed with 30 to 60 volumes of ultra-pure water per volume of the resin.

When a new anion exchange resin (Cl$^-$-type) is used, it is preferred to first perform conditioning. The conditioning is accomplished by first regenerating a new anion exchange resin (Cl$^-$-type) with an aqueous solution of strong alkali, effecting further regeneration with an aqueous solution of carbonate or bicarbonate salt, subsequently passing a 30 to 60% by weight aqueous hydrogen peroxide solution cooled to 5° C. or below through the anion exchange resin at a SV of 5 to 40 hr$^{-1}$ and at a BV of 50 to 100 L/L-R and thereafter regenerating the anion exchange resin with either of an aqueous solution of carbonate or bicarbonate salt and an aqueous solution of fluorocompound (both used as an aqueous regenerant solution) according to intended object.

The thus treated ion exchange resin is drawn by, for example, vacuum suction and fed through a supply port (not shown) into an employed purification tower under pressure in the form of a water suspension. Thus, the ion exchange resin is used in the purification of a crude aqueous hydrogen peroxide solution.

In the present invention, even if channeling is generated in a layer of ion exchange resin, the channeling is broken with the result that, without occurrence of nonuniform regeneration, the ion exchange resin can be regenerated efficiently and homogeneously. Further, in the present invention, the ion exchange resin can be washed to the internal part thereof. Still further, in the present invention, the regeneration of ion exchange resin is carried out by the use of an ion exchange resin tower (regeneration tower) different from purifier towers. Therefore, mixing of the regenerant into the purifier towers can be avoided, and it is not needed to interrupt the purification of aqueous hydrogen peroxide solution.

EXAMPLE

The present invention will further be illustrated below with reference to the following Example which in no way limits the scope of the invention.

Herein, metal ion impurities were measured by the flameless atomic absorption method, the ICP-AES method and the ICP-MS method. The ppm, ppb and ppt are all on the weight basis.

Example 1

Acid sodium pyrophosphate was added to a 60.1% by weight aqueous hydrogen peroxide solution containing metal ion impurities (crude aqueous hydrogen peroxide solution) as listed in Table 1 below so that the concentration of acid sodium pyrophosphate was 0.070 g/lit. The mixture was allowed to stand still for 3 days to thereby effect aging, and passed through a filter of 0.1 μm average pore diameter. The ratio of metal atom Al as a component of the metal ion impurities to phosphorus (P) atom as a component of the added acid sodium pyrophosphate (atomic ratio of Al/P) was 0.039.

The thus filtered aqueous hydrogen peroxide solution was first continuously passed through a first-stage tower packed with $H^+$-type cation exchange resin at a space velocity (SV) of 15 $hr^{-1}$ to thereby bring the aqueous hydrogen peroxide solution into contact with the $H^+$-type cation exchange resin. Subsequently, the thus treated aqueous hydrogen peroxide solution was continuously passed through a tower packed with anion exchange resin in the form of fluoride ions at a space velocity (SV) of 15 $hr^{-1}$ to thereby bring the aqueous hydrogen peroxide solution into contact with the anion exchange resin in the form of fluoride ions. Thereafter, the thus treated aqueous hydrogen peroxide solution, while cooling to −3° C., was continuously passed through a tower packed with anion exchange resin in the form of bicarbonate ions at a space velocity (SV) of 15 $hr^{-1}$ to thereby bring the aqueous hydrogen peroxide solution into contact with the anion exchange resin in the form of bicarbonate ions. Finally, the thus treated aqueous hydrogen peroxide solution was continuously passed through a second-stage tower packed with $H^+$-type cation exchange resin at a space velocity (SV) of 15 $hr^{-1}$ to thereby bring the aqueous hydrogen peroxide solution into contact with the $H^+$-type cation exchange resin.

The above employed ion exchange resins were those regenerated in the following manner.

The regeneration of the above ion exchange resins was performed with the use of another ion exchange tower (regeneration tower) different from the aqueous hydrogen peroxide solution purifier towers.

A product of regeneration of spent SK1B was used as the first-stage and second-stage $H^+$-type cation exchange resins. A 10% by weight aqueous hydrochloric acid solution was utilized as the regenerant. The regeneration of the cation exchange resin was carried out by repeating 10 times a step comprising downflow of the aqueous solution of regenerant therethrough at a SV of 2.25 $hr^{-1}$ and at a BV of 0.75 L/L–R, discontinuing the passing of the aqueous solution of regenerant and upflow of ultra-pure water therethrough at a SV of 13.2 $hr^{-1}$ and at a BV of 0.3 L/L–R. Thereafter, ultra-pure water washing of the cation exchange resin was carried out by repeating 6 times a cycle comprising downflow of ultra-pure water therethrough at a SV of 13.2 $hr^{-1}$ and at a BV of 3.3 L/L–R and upflow of ultra-pure water therethrough at the same SV and BV. Thus, regenerated $H^+$-type cation exchange resin was obtained.

A product of regeneration of used SA20A was utilized as the anion exchange resin in the form of fluoride ions. A 3% by weight aqueous sodium fluoride solution ($SiF_6$ content: 100 ppm or less) was utilized as the regenerant. The regeneration of the cation exchange resin was carried out by repeating 6 times a cycle comprising downflow of the aqueous solution of regenerant therethrough at a SV of 2.25 $hr^{-1}$ and at a BV of 0.75 L/L–R, discontinuing the passing of the aqueous solution of regenerant and upflow of ultra-pure water therethrough at a SV of 13.2 $hr^{-1}$ and at a BV of 0.3 L/L–R. Thereafter, ultra-pure water washing of the cation exchange resin was carried out by repeating 6 times a cycle comprising downflow of ultra-pure water therethrough at a SV of 13.2 $hr^{-1}$ and at a BV of 3.3 L/L–R and upflow of ultra-pure water therethrough at the same SV and BV. Thus, regenerated anion exchange resin in fluoride ion form was obtained.

A product of regeneration of used SA20A was utilized as the anion exchange resin in bicarbonate ion form. The used anion exchange resin was first regenerated with sodium hydroxide. A 5% by weight aqueous sodium hydroxide solution was utilized as the regenerant. The regeneration of the anion exchange resin was carried out by repeating 6 times a cycle comprising downflow of the aqueous solution of regenerant therethrough at a SV of 2.25 $hr^{-1}$ and at a BV of 0.75 L/L–R, discontinuing the passing of the aqueous solution of regenerant and upflow of ultra-pure water therethrough at a SV of 13.2 $hr^{-1}$ and at a BV of 0.3 L/L–R. Thereafter, ultra-pure water washing of the anion exchange resin was carried out by repeating 5 times a cycle comprising downflow of ultra-pure water therethrough at a SV of 13.2 $hr^{-1}$ and at a BV of 3.3 L/L–R and upflow of ultra-pure water therethrough at the same SV and BV.

Subsequently, this anion exchange resin was regenerated with sodium bicarbonate. A 8% by weight aqueous sodium bicarbonate solution was utilized as the regenerant. The regeneration with sodium bicarbonate was carried out by repeating 12 times a cycle comprising downflow of the aqueous solution of regenerant therethrough at a SV of 2.25 $hr^{-1}$ and at a BV of 0.75 L/L–R, discontinuing the passing of the aqueous solution of regenerant and upflow of ultra-pure water therethrough at a SV of 13.2 $hr^{-1}$ and at a BV of 0.3 L/L–R. Thereafter, ultra-pure water washing of the anion exchange resin was carried out by repeating 6 times a cycle comprising downflow of ultra-pure water therethrough at a SV of 13.2 $hr^{-1}$ and at a BV of 3.3 L/L–R and upflow of ultra-pure water therethrough at the same SV and BV. Thus, there was obtained regenerated anion exchange resin in the bicarbonate ion form.

The thus regenerated ion exchange resins were packed in the form of a slurry into the respective purifier towers.

After the completion of passing of aqueous hydrogen peroxide solution through the ion exchange resins, the purified aqueous hydrogen peroxide solution was sampled and diluted with ultra-pure water from which impurities had been removed to an extremely high degree so as to adjust the concentration of hydrogen peroxide to 31% by weight.

The concentrations of metal ion impurities in the thus obtained purified aqueous hydrogen peroxide solution were measured by the flameless atomic absorption method and the ICP-MS method. On the other hand, the concentrations of metal ion impurities in the charged (crude) aqueous hydrogen peroxide solution were measured by the Blameless atomic absorption method and the ICP-AES method.

The results are given in Table 2.

TABLE 1

Metal impurities in charged aqueous hydrogen peroxide solution

| Impurities | Analyzed value (ppb) |
|---|---|
| Al | 770 |
| Cu | 0.2 |
| Fe | 4.5 |
| K | 132 |
| Na | 15160 |
| Pb | 2 |

TABLE 1-continued

Metal impurities in charged aqueous hydrogen peroxide solution

| Impurities | Analyzed value (ppb) |
|---|---|
| Ca | 0.6 |
| Mg | 0.6 |

TABLE 2

Content of metal impurities in obtained purified aqueous hydrogen peroxide solution

| | Measuring limit (ppt) | Measured value (ppt) | | Measuring limit (ppt) | Measured value (ppt) |
|---|---|---|---|---|---|
| Ag | 0.5 | ND | Mg | 0.2 | ND |
| Al | 0.2 | 0.2 | Mn | 0.3 | ND |
| As | 2 | ND | Mo | 0.3 | ND |
| Au | 0.2 | ND | Na | 0.5 | ND |
| B | 4 | ND | Nb | 0.1 | ND |
| Ba | 0.1 | ND | Ni | 0.7 | ND |
| Be | 5 | ND | Pb | 0.1 | ND |
| Bi | 0.2 | ND | Pd | 0.3 | ND |
| Ca | 2 | ND | Pt | 0.2 | ND |
| Cd | 0.3 | ND | Sb | 0.3 | ND |
| Co | 1 | ND | Si | 50 | ND |
| Cr | 1 | 1 | Sn | 0.8 | ND |
| Cu | 0.5 | ND | Sr | 0.05 | ND |
| Fe | 0.5 | 0.7 | Ta | 0.1 | ND |
| Ga | 0.5 | ND | Ti | 2 | ND |
| Ge | 2 | ND | Tl | 0.1 | ND |
| In | 0.1 | ND | V | 1 | ND |
| K | 2 | ND | Zn | 2 | ND |
| Li | 0.02 | ND | Zr | 0.1 | 0.1 |

ND: means that the amount of metal impurities is less than the measuring limit.

COMPARATIVE EXAMPLE 1

The purification of aqueous hydrogen peroxide solution was performed in the same manner as in Example 1, except that ion exchange resins regenerated in the following manner were used. With respect to the metal ion impurity concentrations of obtained aqueous hydrogen peroxide solution, the Na ion, K ion and Al ion concentrations were as high as 120 ppt, 60 ppt and 100 ppt, respectively.

Regeneration of Ion Exchange Resin

A product of regeneration of spent SK1B was utilized as the first-stage and second-stage H$^+$-type cation exchange resins. A 10% by weight aqueous hydrochloric acid solution was utilized as the regenerant. Through the H$^+$-type cation exchange resin, the aqueous solution of regenerant was passed downward at a SV of 2.25 hr$^{-1}$ and at a BV of 4 L/L-R, and thereafter ultra-pure water was passed downward at a SV of 13.2 hr$^{-1}$ and at a BV of 40 L/L-R to thereby effect ultra-pure water washing. Thus, there was obtained regenerated H$^+$-type cation exchange resin.

A product of regeneration of spent SA20A was utilized as the anion exchange resin in fluoride ion form. A 3% by weight aqueous sodium fluoride solution (SiF$_6$ content: 100 ppm or less) was utilized as the regenerant. Through the anion exchange resin, the aqueous solution of regenerant was passed downward at a SV of 2.25 hr$^{-1}$ and at a BV of 4.5 L/L-R, and thereafter ultra-pure water was passed downward at a SV of 13.2 hr$^{-1}$ and at a BV of 40 L/L-R to thereby effect ultra-pure water washing. Thus, there was obtained regenerated anion exchange resin in fluoride ion form.

A product of regeneration of spent SA20A was utilized as the anion exchange resin in bicarbonate ion form. The used anion exchange resin was first regenerated with sodium hydroxide. A 5% by weight aqueous sodium hydroxide solution was utilized as the regenerant. Through the anion exchange resin, the aqueous solution of regenerant was passed downward at a SV of 2.25 hr$^{-1}$ and at a BV of 4.5 L/L-R, and thereafter ultra-pure water was passed downward at a SV of 13.2 hr$^{-1}$ and at a BV of 40 L/L-R to thereby effect ultra-pure water washing. Subsequently, this anion exchange resin was regenerated with sodium bicarbonate. A 8% by weight aqueous sodium bicarbonate solution was utilized as the regenerant. Through the anion exchange resin, the aqueous solution of regenerant was passed downward at a SV of 2.25 hr$^{-1}$ and at a BV of 4.5 L/L-R, and thereafter ultra-pure water was passed downward at a SV of 13.2 hr$^{-1}$ and at a BV of 40 L/L-R to thereby effect ultra-pure water washing. Thus, there was obtained regenerated anion exchange resin in the form of bicarbonate ions.

The thus regenerated ion exchange resins were packed in the form of a slurry into the respective purifier towers.

What is claimed is:

1. A method of regenerating an ion exchange resin, consisting of the steps of:

packing a used ion exchange resin in a regeneration tower; and sequentially repeating, at least twice, a step consisting of passing an aqueous solution of regenerant through the regeneration tower downward from a top part of the regeneration tower and thereafter passing ultra-pure water through the regeneration tower upward from a bottom of the regeneration tower.

2. The method as claimed in claim 1, wherein the aqueous solution of regenerant is passed downward at a space velocity of 1 to 5 hr$^{-1}$ while the ultra-pure water is passed upward at a space velocity of 10 to 30 hr$^{-1}$.

3. The method as claimed in claim 2, wherein, in the regeneration tower, parts brought into contact with the ion exchange resin, the regenerant and the ultra-pure water are composed of a fluororesin, a vinyl chloride resin or a polyolefin resin.

4. The method as claimed in claim 1, wherein, in the regeneration tower, parts brought into contact with the ion exchange resin, the regenerant and the ultra-pure water are composed of a fluororesin, a vinyl chloride resin or a polyolefin resin.

* * * * *